Sept. 10, 1957 N. A. SCHUSTER 2,806,201
ELECTRICAL RESISTIVITY WELL LOGGING
Filed May 21, 1953 2 Sheets-Sheet 1

INVENTOR.
NICK A. SCHUSTER
BY
HIS ATTORNEYS.

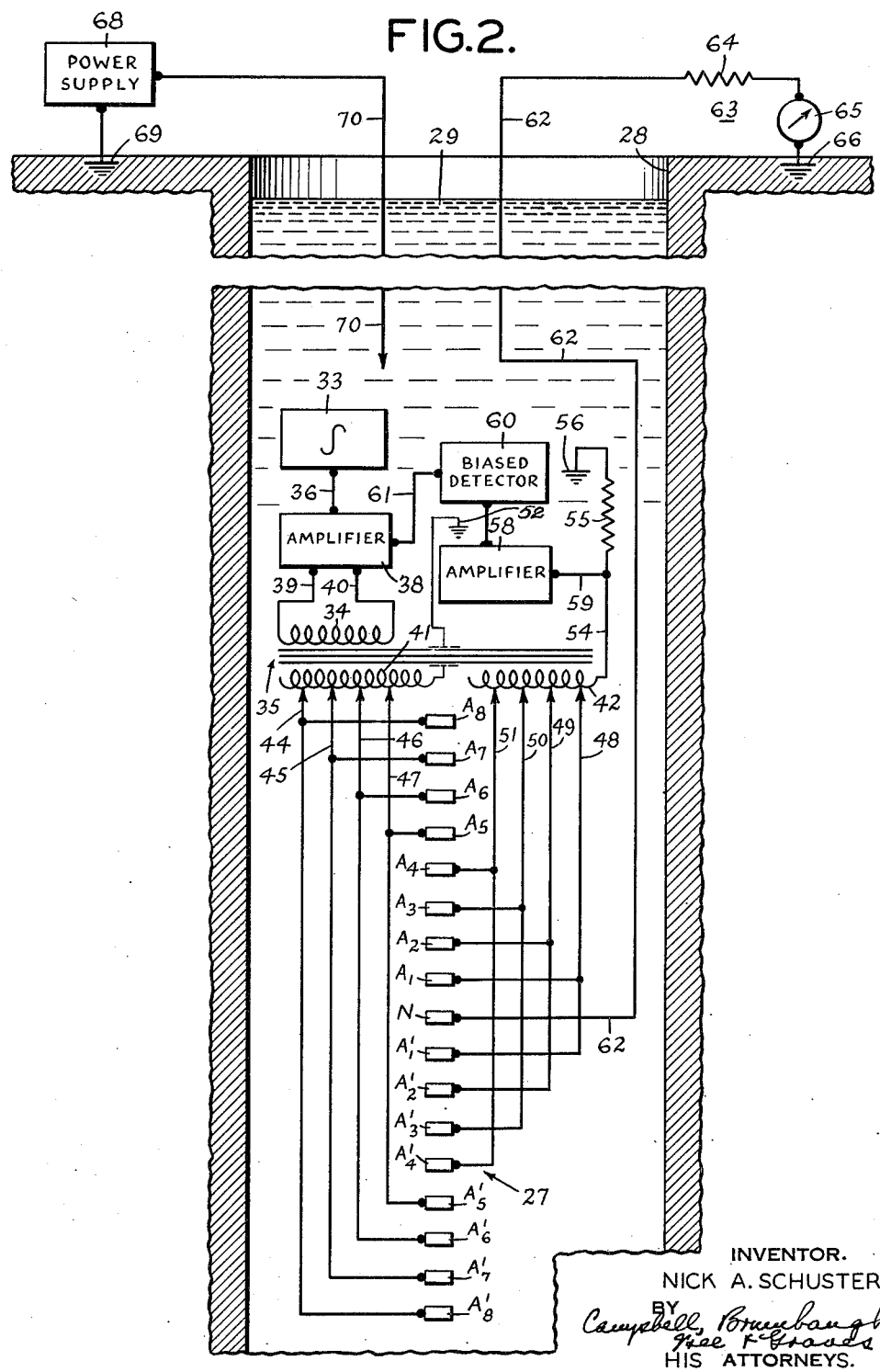

2,806,201

ELECTRICAL RESISTIVITY WELL LOGGING

Nick A. Schuster, Ridgefield, Conn., assignor, by mesne assignments, to Schlumberger Well Surveying Corporation, Houston, Tex., a corporation of Texas Application May 21, 1953, Serial No. 356,507

8 Claims. (Cl. 324—1)

The present invention relates to electrical resistivity well logging and more particularly to novel methods and apparatus for obtaining predetermined current distribution in the earth formations traversed by a bore hole.

In conventional electrical resistivity well logging systems, current is emitted from an electrode placed in the conductive bore hole fluid and thus diverges from said electrode in accordance with spherical geometry as a function of $1/r^2$, where $r$ is the distance from said electrode; that is, the current density at any distance $r$ from said electrode is proportional to $1/r^2$. Recently, highly effective resistivity logging methods and apparatus have been developed in which the current is forced to pass substantially laterally into the earth formations adjacent to the logging array, whereby the current density decreases in the lateral direction as a function of $1/r$ in accordance with cylindrical geometry as disclosed, for example, in the application Serial No. 161,641, filed May 12, 1950, now Patent No. 2,712,627, dated July 5, 1955, for "Electrical Resistivity Well Logging Method and Apparatus," by Henri-Georges Doll.

It would be highly desirable, however, to be able to force the current emitted from a logging array to vary as still other functions of $r$, in general $f(r)$, since each independent resistivity determination will allow still further data concerning the surrounding formations to be obtained. For example, in determining the oil bearing qualities and possible productivity of the earth formations traversed by a bore hole, geologists are interested in ascertaining three unknown quantities, viz., the true electrical resistivity of the earth formations, the resistivity of the zones invaded by the bore hole fluid and the depth of said invasion. By obtaining three independent electrical resistivity logs through the employment of three separate current divergence functions $f_1(r)$, $f_2(r)$ and $f_3(r)$, the three unknown quantities readily may be determined.

It is an object of the invention, accordingly, to obtain electrical resistivity logs based on predetermined, novel current distributions whereby additional data concerning the earth formations may be determined.

Another object of the present invention is to obtain a current distribution from a logging array that varies laterally as any reasonable, predetermined function, $f(r)$.

In accordance with the invention, the potentials at a plurality of longitudinally spaced points in the bore hole are maintained at the values that would obtain at those points if a field having the desired characteristics were present. Under these conditions, current will flow laterally into the surrounding formations and the current distribution will be in accordance with the required function of $r$. Preferably, the current is maintained substantially constant at least in the vicinity of a zone intermediate the endmost of said points and indications are obtained of the potential difference between a reference point and a point intermediate the ends of said zone. The larger the number of points at which the desired potential values are maintained and the closer the spacing between points, the closer the current distribution will be to the particular function of $r$ desired. However, even with the lack of homogeneity prevailing in actual bore hole conditions, it is possible to secure a sufficiently close approximation to the desired current distribution by maintaining the proper potentials at a finite number of longitudinally spaced apart points.

The invention will be better understood by reference to the following detailed description taken in conjunction with the accompanying drawings, in which:

Fig. 2 is a schematic diagram of an electrical well logging array for producing a predetermined current distribution in the earth formations surrounding a bore hole, in accordance with the invention;

In accordance with the invention, indications of formation electrical resistivities are obtained with a logging current having a current distribution which is in substantial conformity with a predetermined function of $r$, $f(r)$ consistent with the possible potential distributions that can be established in three dimensional space, $r$ being the distance along any radial line in a horizontal plane from a point within the bore hole. The invention will first be described for the case where $f(r)$ is equal to one, for which the current density along any axis in a horizontal plane extending radially from a given point is substantially constant.

Figure 1:
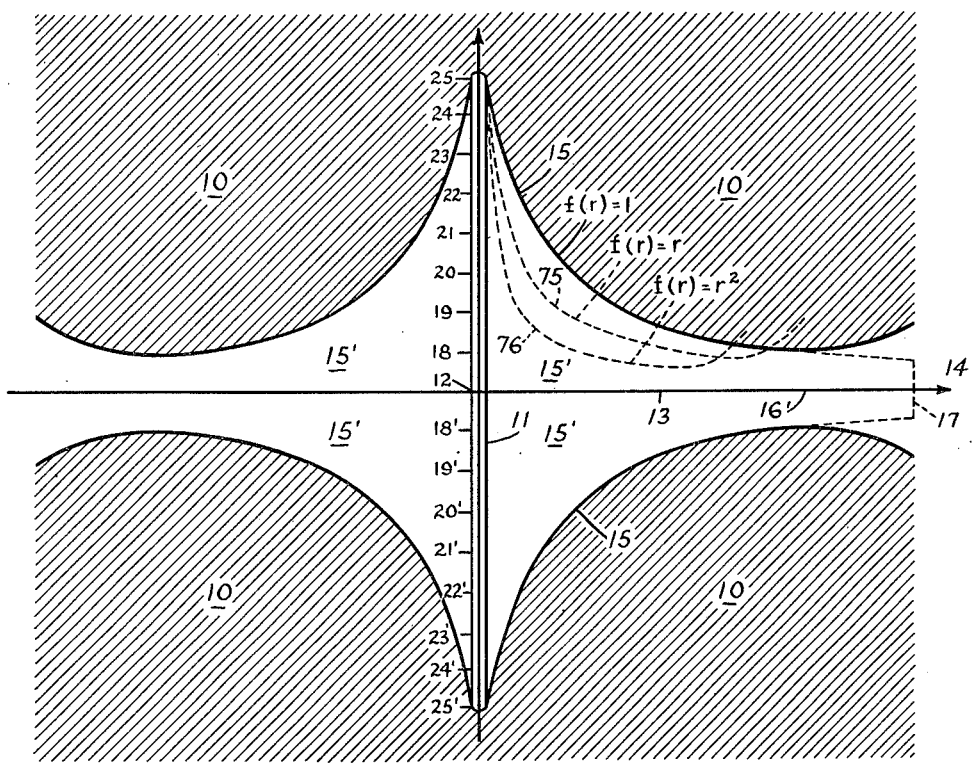
Fig. 1 shows a typical current distribution obtainable in a homogeneous medium, in accordance with the present invention.

In Figure 1 is shown an elongated cylindrical current emitting surface 11 disposed to emit electric current into a homogeneous medium 10. The current emitting surface 11 extends equal distances above and below a midpoint 12 through which passes an imaginary plane 13, perpendicular to the longitudinal axis of the surface 11. For a current distribution in substantial conformity with the relation $f(r)=1$, the current density must remain constant regardless of the radial distance along the imaginary plane 13 from the point 12. This requires that the total area traversed by the current remain constant regardless of the distance $r$ from the point 12. Since the areas of surfaces of revolution about the point 12 increase with $r$, it will be apparent that the altitude of the surface area traversed by the current must decrease with $r$. Thus, the current flow is confined to the volume 15' bounded by the current envelopes 15. It will be noted that the volume 15' converges radially towards the imaginary plane 13. At some radial distance 16' from the point 12, the current beam will begin to diverge, so that it may be considered to have an effective radius 17.

With any possible current distribution, the potential $\phi_z$ of any point on the surface 11 at a distance $z$ above or below the midpoint may readily be ascertained experimentally, by conventional current or potential diagrams, by computations, or by combinations of these methods. For example, if the desired radial potential distribution is expressed as a series of Bessel functions, the required potentials along the z axis of the current distribution can be expressed as a corresponding series of hyperbolic functions. Thus, the potential $\phi_z$ of any point on surface 11 at a distance $z$ above or below midpoint 12 may be computed from the relationship $$\phi_z \alpha \sum_{m=1}^{\infty} a_m \cosh\left(\frac{k_m z}{b}\right) \tag{1}$$

where $b$ is the effective beam length, $k_m$ is the distance corresponding to the $m^{th}$ zero of $J_0(r)$, $J_0$ being a Bessel function of the first kind of zero order, and $a_m$ is a constant different for each value of $m$. The first term of the series given in relation (1) will be very large compared to the remaining terms so $\phi_z$ may be expressed approximately as follows:

$$\phi_z \alpha \cosh\left(\frac{2.4z}{b}\right)$$

The potentials obtained by these computations may then be checked experimentally, for example, in a test tank containing conducting liquid, and corrected where required.

Thus, the potentials $\phi_z$ of the points 18–25 and 18'–25', which may be equally distributed along the surface 11 above and below the midpoint 12, for the case where $f(r)=1$, readily may be determined. Having thus determined the potentials of this series of points, an electrode array may be constructed in which a plurality of electrodes corresponding, respectively, to the points 18–25, inclusive, and 18'–25', inclusive, are maintained at the respective potentials determined for these points. The current flowing from such an electrode array will conform substantially to the desired current distribution during logging operations. It will be obvious to those skilled in the art that the greater the number of potential points or electrodes used, the closer will the actual current distribution conform to the theoretical current distribution.

Typical electrical logging apparatus according to the invention is shown in Fig. 2. It comprises an elongated electrode array 27 disposed in a bore hole 28 containing a relatively conductve fluid 29. Suitable means such as a conventional electrical cable and winch combination (not shown) may be provided for moving the electrode array 27 through the bore hole 28. The electrode array 27 may comprise a plurality of current emitting electrodes $A_1$–$A_8$ and $A'_1$–$A'_8$ which are longitudinally spaced equal distances apart and symmetrically disposed about a central electrode N.

As stated, the electrodes $A_1$–$A_8$ and $A'_1$–$A'_8$ are maintained at the potentials that would obtain at the corresponding points in the bore hole if the desired field distribution were present. To this end, the electrodes $A_5$–$A_8$ and the corresponding electrodes $A'_5$–$A'_8$, respectively, are connected by the conductors 47, 46, 45 and 44, respectively, to appropriate voltage taps on the secondary winding 41 of a transformer 35, one terminal of which is grounded at a relatively remote point 52. Similarly, the electrodes $A_1$–$A_4$ and the corresponding electrodes $A'_1$–$A'_4$, respectively, may be connected by the conductors 48–51, respectively, to appropriate voltage taps on another secondary winding 42 of the transformer 35. One terminal of the secondary winding 42 may be grounded at a relatively remote point 56 through a conductor 54 and a resistor 55 of very low value.

The transformer 35 has a primary winding 34 connected by the conductors 39 and 40 to the output terminals of a controllable gain amplifier 38 which receives an alternating signal input through the conductors 36 from a suitable oscillator 33.

The central electrode N may be connected through a conductor 62 and a high impedance 64 to one terminal of a galvanometer 65, the latter two elements constituting an indicator 63. The other terminal of the galvanometer 65 is connected to the ground or reference point 66.

In order to make the readings of the indicator 63 directly a function of the electrical resistivity of the formations, the logging current in the vicinity of the electrode N, e. g., the current emitted by the electrodes $A_1$–$A_4$ and $A'_1$–$A'_4$, should be maintained substantially constant in intensity. This may be accomplished by supplying the potential drop across the resistor 55, which is proportional to the current flowing in the conductor 54, through leads 59 to an amplifier 58, the output of which is fed to a conventional detector device 60. The detector device 60 provides a D. C. voltage, varying as a function of the current in the conductor 54, which is fed to gain control means in the amplifier 38 and adjusts the signal applied to the transformer primary winding 34 as required to maintain the current intensity in the conductor 54 substantially constant.

It will be apparent that the impedances of the output circuits including the transformer secondary windings 41 and 42 should be low so that the proper potential distribution will be maintained on the electrodes in the array 27, regardless of the intensity of the current flow therefrom. Further, the value of the resistor 55 should be small to eliminate any error in the potentials applied to the electrodes connected to the secondary winding 42. If desired, a voltage equal and opposite to the voltage across the resistor 55 could be introduced in series with the latter to eliminate any possible error completely.

The electrical components shown in the bore hole in Fig. 2 are preferably lowered into the bore hole with the electrode array in a suitable pressure resistant cartridge. The electrical power therefor may be supplied from a power supply 68 at the surface of the earth through a cable conductor 70. The return current electrode shown as the ground 69 in Fig. 2 may be at the surface of the earth or it may be located on the supporting cable at a point relatively remote with respect to the logging array 27.

In operation, the system shown in Fig. 2 acts to maintain on the electrodes $A_1$–$A_8$ and $A'_1$–$A'_8$ potentials corresponding to those that would obtain at the positions of the electrodes if a current distribution in conformity with $f(r)=1$ were present.

Meanwhile, the degenerative feedback control of the variable gain control amplifier 38 acts to maintain a constant value of current emission from the electrodes $A_1$–$A_4$ and $A'_1$–$A'_4$ as the electrode array 27 is moved through the bore hole. As a result, the readings of the indicator 63 are directly a function of the electrical resistivity of the earth formation at the level of the electrode array 27 in the bore hole.

If desired, indications of formation resistivity could be obtained without maintaining the logging current constant, by means of a conventional ratiometer connected to respond jointly to the voltage across the resistor 55 and to the potential difference between the electrode N and the ground point 66.

It will be readily apparent that the potentials on the electrodes $A_1$–$A_8$, inclusive, and $A'_1$–$A'_8$, inclusive, may be adjusted to correspond to other possible current distributions involving different functions of $r$. For example, it is often desirable to obtain indications of the true formation resistivity in the presence of an invaded zone having a very high resistance. In order to obtain such indications, it would be desirable to obtain a resistivity reading which is influenced largely by the earth formations located at large values of $r$ with respect to some central point in the bore hole and, to a lesser extent by the earth formations at nearby locations. This can be achieved if the current density is made to increase at increasing lateral depths of penetration as represented by the functions $f(r)=r$, or $f(r)=r^2$, for example. The dotted curves 75 and 76, respectively, in Fig. 1 define the boundaries of the current distributions corresponding to these functions. It will be understood that either form of current distribution may be established by appropriate adjustment of the potentials applied to the electrodes $A_1$–$A_8$, inclusive, and $A'_1$–$A'_8$, inclusive.

Figure 3:
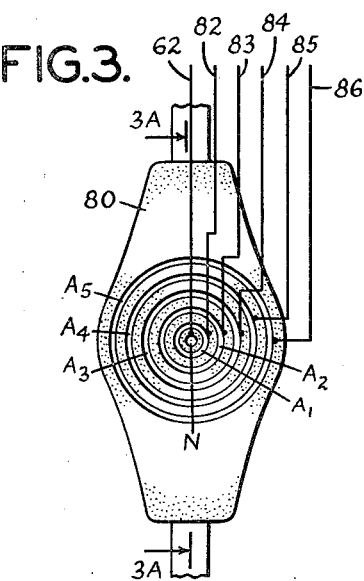
Fig. 3 is a front view of a wall engaging carrier pad for supporting an electrode array, in accordance with a further embodiment of the invention.
Figure 3A:
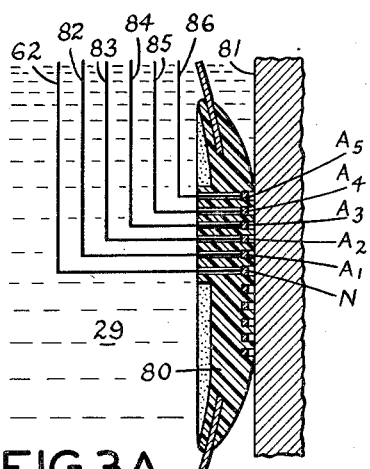
Fig. 3A is a side view, in vertical section, taken along the line 3A—3A of the wall engaging carrier pad shown in Fig. 3.

Figs. 3 and 3A illustrate a well logging system of the type disclosed in the copending application Serial No. 214,273, filed March 7, 1951, now Patent No. 2,712,629, dated July 5, 1955, for "Electrical Logging of Earth Formations Traversed by a Bore Hole," by Henri-Georges Doll, modified in accordance with the invention. In these figures, a conventional nonconductive, wall engaging carrier pad 80 may be utilized to press a plurality of current emitting electrodes $A_1$–$A_5$, for example, and a potential pickup electrode N against the wall 81 of the bore hole 28. The electrodes shown in Figs. 3 and 3A may be connected in a system substantially the same as that shown in Fig. 2. For example, the current emitting electrodes $A_1$ and $A_2$ may be connected by the conductors 82 and 83 to appropriately positioned taps on the transformer secondary winding 42 (Fig. 2) and the current emitting electrodes $A_3$–$A_5$, inclusive, may be connected to appropriately positioned taps on the secondary winding 41 by the conductors 84, 85 and 86, respectively. The central electrode N may be connected by the conductor 62 to the indicator 63.

The embodiment shown in Fig. 3 operates in essentially the same manner as the apparatus of Fig. 2. The proper potentials for the electrodes $A_1$–$A_5$, inclusive, may be determined in manner similar to that described above, although the calculations will involve Legendre functions instead of Bessel functions. The electrodes $A_1$–$A_5$, inclusive, would be maintained at the correct potential values by adjustment of the corresponding taps on the secondary windings 41 and 42 (Fig. 2). Further, a degenerative feedback control from the secondary winding 42 would be utilized to maintain substantially constant the current emission from at least several of the intermediate electrodes nearest the electrode N.

The invention thus enables a predetermined current distribution to be substantially achieved in electrical logging operations in a bore hole. This is accomplished by disposing a plurality of electrodes in the bore hole and adjusting the potentials on the several electrodes to conform to the potentials that would exist at points where the electrodes are located if the desired current distribution were present.

While the electrode array in Fig. 2 is symmetrical about the electrode N, it will be understood that an unsymmetrical array, e. g., one including only the electrodes N and $A_1$–$A_8$, inclusive, would have utility in obtaining indications of formation resistivity close to the bottom of a bore hole.

The several embodiments disclosed are merely exemplary and they are obviously susceptible of modification and change without departing from the spirit and scope of the invention. For example, the number of electrodes may be either more or less than in the several embodiments described, although the greater the number of electrodes used, the closer will be the actual current distribution to the distribution desired. Further, constant current may be emitted from either more or less than the number of constant current electrodes in Fig. 2. It is preferred, however, to emit constant current from the electrodes disposed immediately adjacent the central electrode N. Other modifications will be apparent to those skilled in the art. The invention, therefore, is deemed not to be limited except as defined in the appended claims.

I claim:

1. Apparatus for investigating earth formations traversed by a bore hole, comprising an electrode array adapted for movement through the bore hole and including a plurality of electrodes longitudinally spaced apart with respect to said bore hole axis, means for maintaining fixed the ratios between the potentials at said electrodes, respectively, with respect to the potential at a current return point electrically remote from said plurality of electrodes, said potentials increasing progressively in opposite directions from a location intermediate the ends of said array, means for maintaining a constant current emission from at least some of said electrodes in the vicinity of said location, potential pickup electrode means in the vicinity of said location in said electrode array, and means for indicating the potential difference between said electrode means and a relatively remote reference point at ground potential.

2. Apparatus for investigating earth formations traversed by a bore hole, comprising an electrode array adapted for movement through the bore hole and including a plurality of electrodes longitudinally spaced apart with respect to the bore hole, a source of electrical energy, variable gain amplifying means, voltage distributing means having input means and at least two tapped output means, said variable gain amplifying means connecting said source of electrical energy to the input means of said voltage distributing means, means connecting one group of said electrodes intermediate the ends of said array to respective taps on one of the output means of said voltage distributing means, means connecting another group of electrodes between said intermediate electrodes and the ends of said array to respective taps on the second output means of said voltage distributing means, degenerative feedback means responsive to the current in one of said output means for controlling the gain of said variable gain amplifying means to maintain said current substantially constant, means connecting one end terminal of each of said output means to a current return point electrically remote from said plurality of electrodes, and indicating means connected to receive the potential difference between an electrode in said electrode array and a relatively remote reference point.

3. Apparatus for investigating earth formations traversed by a bore hole comprising an array of electrodes adapted for movement through a bore hole, said array of electrodes including a first electrode intermediate the ends of said array, a first plurality of pairs of current emitting electrodes disposed symmetrically about said electrode, and a second plurality of pairs of current emitting electrodes disposed symmetrically about said first electrode and outside said first plurality of pairs of electrodes, the electrodes in each of said pairs of electrodes being spaced apart longitudinally of the bore hole and the spacings between the electrodes of the several pairs increasing progressively going from said first electrode outwardly, a source of electrical energy, voltage distributing means having input means and at least two tapped output means, each of said two tapped output means having an end terminal connected to a current return point electrically remote from said array of electrodes, variable gain control amplifying means for connecting said source of electrical energy to said input means of said distributing means, means connecting said first plurality of pairs of electrodes to the respective taps on one of said output means to maintain said first plurality of pairs of electrodes at progressively increasing potentials with respect to the potential at the current return point for said one output means, going outwardly from said first electrode, means connecting said second plurality of pairs of electrodes to the respective taps on the other of said output means to maintain said second plurality of electrodes at further increasing potentials with respect to the potential at the current return point for said other output means, going outwardly from said first plurality of pairs of electrodes, impedance means in the current path to one of said output means, degenerative feedback means responsive to voltage variations across said impedance means for controlling the gain of said variable gain amplifying means to maintain the current emission from said first plurality of pairs of electrode means constant, and means for indicating the potential differences between said first electrode and a relatively remote reference point.

4. In a method for investigating earth formations traversed by a bore hole, the steps of establishing, between an electrically remote current return point and a plurality of locations on the bore hole wall that are near each other and spaced apart in opposite directions along the bore hole from, and symmetrical about a bore hole radius, absolute electrical potentials that increase progressively in magnitude in said opposite directions from said radius, and exhibiting a function of the relation between (1) the current emission at at least some of said locations comprising a group lying in a zone intermediate the endmost of said locations and disposed centrally thereof and (2) the potential difference between an electrically remote reference point at earth potential and a point in said zone.

5. In a method for investigating earth formations traversed by a bore hole, the steps of establishing, between an electrically remote current return point and a plurality of locations in the bore hole that are near each other and spaced apart longitudinally of the bore hole, electrical potentials that increase progressively in magnitude going outwardly from an intermediate one of said locations, maintaining a substantially constant current emission at at least some of said locations in the vicinity of said intermediate one, and exhibiting a function of the potential difference between an electrically remote reference point at earth potential and a point in the vicinity of one of said locations where a substantially constant current emission is maintained.

6. In a method for investigating earth formations traversed by a bore hole, the steps of establishing, between an electrically remote current return point and a plurality of loop-shaped bore hole wall zones of different sizes that are centered on a bore hole radius, electrical potentials that increase progressively in magnitude with zone spacing from said radius, maintaining a substantially constant current emission at at least some of said zones in the vicinity of the common center of said loop-shaped zones and exhibiting a function of the potential difference between an electrically remote reference point at earth potential and a point in the vicinity of the common center of said loop-shaped zones.

7. In apparatus for investigating earth formations traversed by a bore hole, the combination of an array of electrodes adapted to be lowered into a bore hole, said electrodes being spaced apart longitudinally of the bore hole, means for maintaining between an electrically remote current return point and said respective electrodes potentials increasing progressively going from an intermediate one of said electrodes in opposite directions to the endmost electrodes, and means for exhibiting a function of the relation between (1) the current emission from at least some of said electrodes in the vicinity of said intermediate one and (2) the potential difference between an electrically remote point at earth potential and a point in the vicinity of said intermediate one of said electrodes.

8. In apparatus for investigating earth formations traversed by a bore hole, the combination of a support adapted to be lowered into a well and carrying an electrode array including a central electrode and a plurality of loop-shaped electrodes of different sizes concentric with said central electrode, means urging said electrode array against the bore hole wall and including means substantially completely blocking off direct electrical communication between said electrodes and any electrically conductive liquid in the bore hole, means for maintaining between an electrically remote current return point and certain of said electrodes potentials progressively increasing in magnitude, respectively, going outwardly from said central electrode, means for maintaining constant current emission from at least some of the electrodes in the vicinity of said central electrode, and means for providing indications of potential difference between said central electrode and an electrically remote reference point at earth potential.

References Cited in the file of this patent
UNITED STATES PATENTS 2,347,794  Piety _____ May 2, 1944

OTHER REFERENCES

"Exploration Physics," 1950, 2nd ed., by Jakosky. Published by Trija Pub. Co., Gayley Ave., Los Angeles, California, pp. 1034–1037.